No. 610,152. Patented Aug. 30, 1898.
W. H. BINNS.
SPROCKET ATTACHMENT FOR CYCLES.
(Application filed Jan. 20, 1896.)

(No Model.)

Attest:
James Lavallée
M. H. Holmes

Inventor:
William H. Binns,
by Robert Burns, Atty.

THE NORRIS PETERS CO., PHOTO-LITHO., WASHINGTON, D. C.

UNITED STATES PATENT OFFICE.

WILLIAM H. BINNS, OF CHICAGO, ILLINOIS, ASSIGNOR TO THE A. FEATHERSTONE & COMPANY, OF SAME PLACE.

SPROCKET ATTACHMENT FOR CYCLES.

SPECIFICATION forming part of Letters Patent No. 610,152, dated August 30, 1898.

Application filed January 20, 1896. Serial No. 576,212. (No model.)

*To all whom it may concern:*

Be it known that I, WILLIAM H. BINNS, a citizen of the United States, residing at Chicago, in the county of Cook and State of Illinois, have invented a certain new and useful Improvement in Sprocket Attachments for Cycles; and I do hereby declare the following to be a full, clear, and exact description of the same, reference being had to the accompanying drawings, forming a part of this specification.

The present invention relates to the firm and substantial attachment of the sprocket-wheels and other like cycle parts to their carrying arbors or axles in a detachable manner.

The object of the present improvement is to provide a simple and effective attaching means that is capable of ready detachment when required and which is adapted to take up wear of the attaching surfaces as the same occurs, as will hereinafter more fully appear, and be more particularly pointed out in the claims. I attain such object by the construction and arrangement of parts illustrated in the accompanying drawings, in which—

Figure 1:
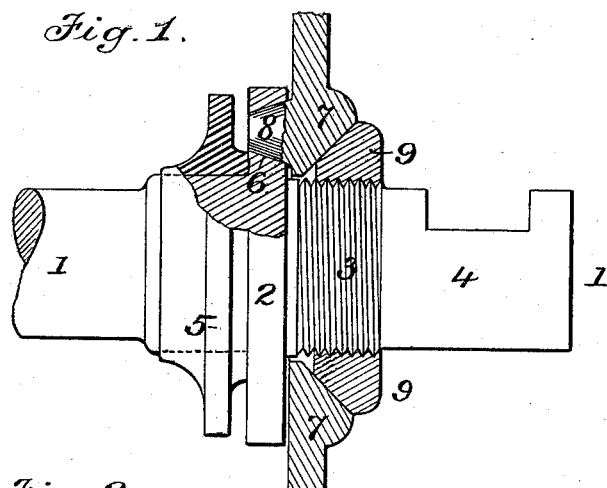
Figure 2:
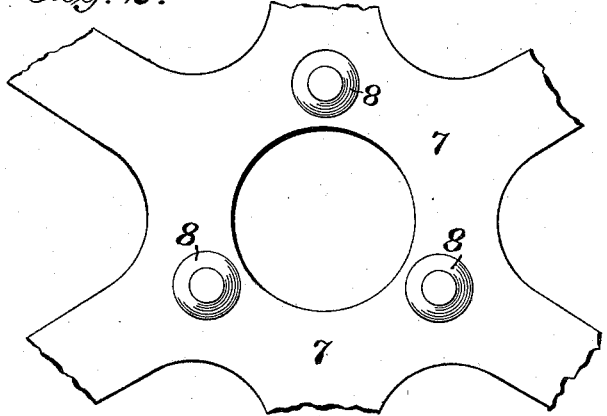
Figure 3:
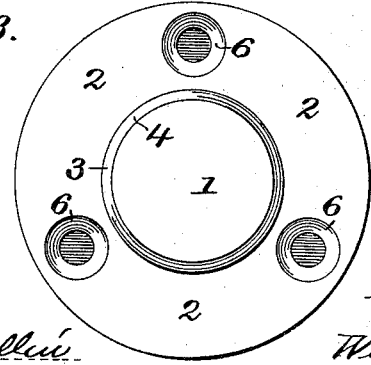

Figure 1 is an enlarged detail longitudinal sectional elevation of the sprocket-wheel and crank-axle of a bicycle, illustrating my improved means of attachment; Fig. 2, a side elevation of the hub portion of the sprocket-wheel constructed in accordance with the present improvement; Fig. 3, an end elevation of the axle, illustrating the formation of the axle-collar in accordance with the present improvement.

Similar numerals of reference indicate like parts in the several views.

Referring to the drawings, 1 represents an end portion of an axle formed with an enlarged portion, preferably in the form of an attaching collar 2, a screw-threaded portion 3 adjacent thereto, a shank 4 for the attachment of the pedal-crank, and the usual secondary collar 5 a short distance removed from the attaching collar 2, so as to form the usual annular dust-catching chamber outside the ball-bearings at that end of the axle.

In the present improvement the attaching collar 2 is formed with a series of three equidistantly and concentrically arranged conically-formed recesses or holes 6.

7 is the hub of the sprocket-wheel or other analogous bicycle part, which in the present improvement is provided with a series of three equidistantly and concentrically arranged conically-formed studs or projections 8, that are adapted to engage the conical holes 6 of the attaching collar 2 and are made sufficiently large so that all contact between the sprocket-hub and the attaching collar will be upon the surface of such conical studs and holes, as illustrated in the drawings, and so that as such parts wear away during a long-continued use such wear may be taken up by a further adjustment of the parts toward each other without the main and adjacent surfaces of the hub and collar coming together to prevent further adjustment.

The hub of the sprocket-wheel is held to its engagement by a nut 9, arranged centrally with relation to the concentrically-arranged studs or projections 8 and which screws onto the screw-threaded portion 3 of the axle. Such nut is preferably made with a cone-shaped outer surface, as shown, so as to engage in a similarly-formed cone-shaped bore of the sprocket-wheel hub, so as to occupy but little space longitudinally upon the axle, and thus attain the very desirable feature of an axle having a minimum length and yet a substantial construction of its bearing and attaching parts.

The central arrangement of the nut 9 with relation to the concentrically-arranged studs 8, as well as the employment of a single nut as a holding means, is a material part of the present invention, as by such construction a coaction of the parts takes place, whereby the different studs are forced to engagement in a very uniform manner, with the resultant effect that the strain or load is evenly distributed on the whole series of studs in practical use.

Having thus fully described my said invention, what I claim as new, and desire to secure by Letters Patent, is—

1. The combination of an axle, and hub, the one provided with a series of equidistantly and concentrically arranged conical holes 6, and the other with a series of similarly-arranged conical studs 8, and a centrally-arranged holding-nut 9, screwing onto the axle, and adapted to cause the studs 8, to have a uniform bearing within the receiving-holes 6, as described and for the purpose set forth.

2. The combination of an axle, and hub, the one provided with a series of equidistantly and concentrically arranged conical holes 6, and the other with a series of similarly-arranged conical studs 8, and a centrally-arranged holding-nut 9, screwing onto the axle, and having a cone-shaped outer surface engaging a correspondingly-formed bore in the hub, the said centrally-arranged nut being adapted to force the studs 8 to a uniform bearing within the receiving-holes 6, as described and for the purpose set forth.

In testimony whereof witness my hand this 17th day of January, 1896.

WILLIAM H. BINNS.

In presence of—
ROBERT BURNS,
JAMES LAVALLIN.